United States Patent Office 3,417,065
Patented Dec. 17, 1968

3,417,065
CIS-1,4 COPOLYMERS OF BUTADIENE AND
2-PHENYL-BUTADIENE
Walter Marconi, San Donato Milanese, Milan, Alessandro Mazzei and Mario Araldi, Milan, and Mario Bruzzone, San Donato Milanese, Milan, Italy, assignors to SNAM-S.p.A., Milan, Italy, a corporation of Italy
No Drawing. Filed May 13, 1964, Ser. No. 367,213
Claims priority, application Italy, May 15, 1963, 10,084/63; Oct. 2, 1963, 20,156/63
14 Claims. (Cl. 260—83.7)

ABSTRACT OF THE DISCLOSURE

Copolymers of butadiene and 2-phenyl-butadiene in which at least 90% of the butadiene units are 1,4-cis enchained have a workability superior to that of 1,4-cis polybutadiene and better dynamic properties than butadiene-styrene copolymers. The products may be made by copolymerization in the presence of an iodine-containing catalyst comprising a compound of a transition metal of Group IVa, Va, VIa or VIII, and a reducing compound of a metal of group I, II or III.

---

The present invention relates to new, substantially linear, stereoregular copolymers of conjugated diolefins which can be vulcanized, as well as to a process for the preparation thereof by means of anionic mechanism acting coordination catalysts.

More precisely it relates to new stereoregular copolymers of butadiene and 2-phenyl-butadiene as well as to a process for the preparation thereof by the copolymerization of butadiene and 2-phenyl-butadiene in the presence of complex catalytic system comprising two or more components.

It is known that an elastomer constituted by chains of polybutadiene having a high content of 1,4-units, and particularly of 1,4-cis units, possesses very good dynamic characteristics due to the high flexibility of the macromolecular chains.

It is also known that the polybutadiene, also when the content in 1,4-cis units is very high, possesses insufficient workability (with the generic term of workability it is intended in the present invention both the behavior of the elastomer in the mixer during the admixture of the ingredients and the behavior of the mixture during the successive extrusion, calendering and similar operations) so that the use of said elastomer alone in the production of many industrial articles such as tires, fabric reinforced bands and so on, is difficult and sometimes not convenient from a practical point of view.

In such case it is possible to obviate to the insufficient workability by admixing it with other already known, synthetic or natural elastomers: however this causes a remarkable decrease in certain properties peculiar to the polybutadiene such as for example resistance to abrasion, dynamic characteristics, flexibility at low temperatures and so on.

There have been available on the market, for a long time, copolymers of butadiene and styrene obtained by emulsion polymerization, whose workability characteristics are generally considered satisfactory in the technological field.

The mechanical properties of these vulcanized elastomers are lower than those of a 1,4-cis polybutadiene because not all the butadienic units are 1,4-enchained.

More recently butadiene-styrene copolymers have been synthetized in solution (Philprene X–40) with particular catalysts able to cause 1,4 enchainment of butadiene units (40% 1,4-cis and 54% 1,4-trans).

Such copolymers show a workability remarkably higher than that of 1,4-cis polybutadiene and in some cases, as e.g. in the extrusion process, a workability also superior to that of the usual butadiene-styrene rubbers.

However from the point of view of the dynamic properties of the vulcanized elastomer, it is noted that these copolymers are decidely inferior to 1,4-cis polybutadiene and do not show evident advantages with respect to a butadiene-styrene copolymer prepared in emulsion; from the viewpoint of the heat build-up by repeated bending they are worse.

Applicants have now surprisingly found that a stereoregular butadiene-2-phenylbutadiene copolymer, although it comprises like the butadiene-styrene copolymers, sidechain substituent phenyl groups, and like the butadiene homopolymers a main polybutadienic chain, shows a better set of properties than those of the previously mentioned elastomers.

In these new copolymers, unlike the already known dienic copolymers, the butadiene units are prevailingly, up to substantially, 1,4-cis enchained.

Then the objects of the present invention are:

(a) substantially linear, stereoregular butadiene-2-phenylbutadiene copolymers apt to be vulcanized;
(b) substantially linear butadiene-2-phenylbutadiene copolymers which can be vulcanized and wherein the butadiene units present 1,4-cis enchainment for at least 90%;
(c) a process for the preparation of substantially linear, stereoregular vulcanizable butadiene-2-phenylbutadiene copolymers;
(d) a process for the preparation of substantially linear copolymers butadiene-2-phenylbutadiene which can be vulcanized and wherein the butadiene units show 1,4-cis enchainment for at least 90%.

The properties of the copolymers according to the present invention can be summarized as follows:

The workability is remarkably superior than that of a 1,4-cis polybutadiene and comparable with that of the butadiene-styrene copolymers prepared in solution, particularly with regard to the very good extrudibility;

The dynamic properties, and particularly the heat build-up by repeated flexural actions, are far better than those of the butadiene-styrene copolymers and very near to those of a polybutadiene with a high content of 1,4-cis units;

The low temperature flexibility and the resistance to abrasion are higher than those of the butadiene-styrene copolymers and very near to those shown by a 1,4-cis polybutadiene.

Thus essentially, this new stereoregular elastomer combines in itself the very good workability characteristics of the butadiene-styrene copolymers with the very good dynamic properties, the abrasion resistance and the flexibility at low temperatures of the 1,4-cis polybutadiene.

The amount of the two monomers present in the copolymer can be as wide as possible, comprised between 5 and 95%.

Practically, due to the higher cost of the 2-phenyl-butadiene with respect to the butadiene, copolymers with percentages of phenylbutadiene between about 5 and 40% are preferred.

The very good technological properties of the copolymers according to the invention are already remarkable with polymers containing 10–15% of phenylbutadiene, but the optimum is achieved with copolymers comprising 15–25% of phenylbutadiene.

As previously indicated, it is possible, by varying the preparation process, and more precisely by suitably selecting the catalyst, to obtain a copolymer wherein the butadienic units show 1,4-cis enchainment for at least 90%. The 1,2 units content is very low.

The phenylbutadienic units in the copolymer always show substantially a 1,4 structure.

The intrinsic viscosity of the raw copolymer can have any desired value depending on the amount of the catalyst employed, on the polymerization temperature, and on the amount of solvent. It is little affected by the percentages of the introduced phenylbutadiene.

The process for the preparation of the copolymers according to the invention is characterized by the use of complex catalytic systems, comprising two or more components, each soluble in the common polymerization solvents.

Said components are selected in the classes hereinafter defined:

(a) Compounds of the transition metals of the Groups IVa, Va, VIa or of the Group VIII of the Periodic System according to Mendeleeff, in particular Ti and V halides.

(b) Reducing compounds of metals of the I, II and III groups, in particular Al, with the understanding that herewith are considered as reducing compounds metal hydrides (hydride, halo-hydrides, amino-hydrides, amino-halo-hydrides) simple or complexed with electron-releasing substances (Lewis bases), or metal-organic compounds.

Examples of such compounds are: the halo-hydrides of aluminum etherates as $AlHCl_2 \cdot (C_2H_5)_2O$, $$AlH_2I \cdot (C_2H_5)_2O,$$

etc.; the amino-alanes as $H_2Al-N(CH_3)_2$, $$HClAl-N(C_2H_5)_2,$$

etc.; the aluminum hydrides complexed with amines, as $AlH_3 \cdot N(CH_3)_3$; the trialkyl-aluminum compounds and the halides, hydrides or the alkoxides of mono- or dialkyl-aluminum.

(c) Elementary iodine or inorganic iodides such as $AlI_3$, $BiI_3$, $MgI_2$ and so on.

The catalyst systems to be employed in the process of the present invention have to contain at least a component selected in the class (a) and at least a component selected in the class (b). In all cases the polymerization proceeds with good yields of copolymer.

However, when a copolymer is desired having a high content of butadienic units which are 1,4-cis enchained and more precisely with a 1,4-cis content of at least 90%, it is essential that the catalyst contain iodine.

Thus, if none of the components selected from the classes (a) and (b) contain iodine, it will be necessary to add a further component selected from the class (c).

The best results are obtained with catalytic systems containing iodine wherein the component (a) is a Ti halide and the component (b) is an aluminum hydride, halo-hydride, amino-hydride, amino-halo-hydride, simple or complexed with a Lewis base. It is thus the preferred alternative of the process according to the present invention.

Examples of the above said catalytic systems are the following:

$TiCl_4 + I_2 + AlHCl_2 \cdot O(C_2H_5)_2$,
$TiI_2Cl_2 + AlHBrN(CH_3)_2$,
$TiCl_4 + AlI_3 + AlHCl_2 \cdot O(C_2H_5)_2$,
$TiCl_4 + AlI_3 + AlH_2N(CH_3)_2$,
$TiCl_4 + BiI_3 + AlHCl_2 \cdot O(C_2H_5)_2$,
$TiCl_4 + AlI_3 + AlH_3 \cdot N(CH_3)_3$,
$TiCl_4 + AlHI_2 \cdot O(C_2H_5)_2$,
$TiCl_4 + AlHIN(CH_3)_2$,
$TiCl_4 + AlHI_2 \cdot O(C_2H_5)_2 + AlHCl_2 \cdot O(C_2H_5)_2$,
$TiI_2Cl_2 + AlR_3$,
$TiCl_4 + AlHN(CH_3)_2 + AlI_3$,
$TiCl_4 + I_2 + AlR_3$,
$LiH + TiCl_4 + AlR_2I$,
$Al(C_2H_5)_2I + TiCl_3 \cdot \frac{1}{3} AlCl_3$.

The catalyst components can be admixed in variable molar ratios.

However, in order to obtain good yields of copolymer and a high content of 1,4 structure it is necessary that the molar ratio between the reducing compound and the compound of the transition metal be generally higher than 1, and particularly between 2:1 and 8:1.

Also the molar ratio between iodine (or iodine-containing compound) and the compound of the transition metal affects the course of the reaction both in regard to the yields in copolymer and in regard to its structure.

Useful ratios are comprised between 0.25:1 and 50:1 and preferably between 0.5:1 and 15:1 expressed as ratios between gram-atoms of iodine and gram-moles of the compound of the transition metal.

The catalyst amount is generally comprised between 0.25 and 5% by weight, calculated as sum of the compounds used, in respect to the sum of the two monomers which are polymerized.

The polymerization is carried out in the presence of inert, aromatic solvents such as benzene, toluene and so on, or in aliphatic solvents such as for example petrol ether, n-heptane and so on, the concentrations by weight of the monomers may vary between wide limits but preferably is between 10 and 20% expressed as weight by volume.

The reaction temperature can vary between −20° and +70° C. and preferably between −5° and +25° C., particularly when contents of 1,4-cis enchained butadienic units of at least 90% are aimed at. The polymerization duration is of some hours.

The catalytic system components may be introduced separately, as a solution, in the reaction space, or the catalyst may be prepared separately by admixing the solutions of the components or the pure components with the solvent.

These interact to form a solution or suspension of the true active catalytic agent.

It is practically of no consequence whether one first adds one or the other of the components forming the catalyst, as well as one or the other of the monomers.

However, it is preferred to add to the solvent, successively, the aluminum reducing compound, the two monomers and then the compound of the transition metal or its mixture with iodine or the iodine containing compound.

From the polymerization a viscous solution is obtained from which the copolymer is precipitated according to known methods. Yield of solid copolymer, in the present description, refers to the ratio by weight between the copolymer which can be coagulated with methyl alcohol and the sum of the fed monomers, referred to as 100.

The exact percentage of the two monomers present in the copolymer as well as the structure of the butadiene and phenylbutadiene units has been determined by means of I.R. analysis, by previously taring the relative absorption bands with weighed mechanical mixtures of the 2 homopolymers.

Analysis by means of X-ray spectrography has revealed, for all the produced copolymers, the absence of crystallinity.

The invention will be better illustrated by the following examples which, however, are in no way to be considered as limitative.

Examples 1–8

In the following examples butadiene and 2-phenyl-butadiene are copolymerized in varying percentages, using a catalyst system formed by:

$$AlI_3 + TiCl_4 + AlHCl_2 \cdot (C_2H_5)_2O$$

The recipe is as follows:

Toluene _____ 100 cc.
TiCl$_4$ _____ 0.2275·10$^{-3}$ moles.[1]
AlI$_3$ _____ 0.2275·10$^{-3}$ moles.
AlHCl$_2$·O(C$_2$H$_5$)$_2$ ___ 1.138·10$^{-3}$ moles.[2]
Butadiene _____ See Table I.
2-phenylbutadiene _____ Do.
Duration of polymerization ___ 15 hours.

[1] G.-atom of I/Moles of TiCl$_4$=3.
[2] Moles of AlHCl$_2$·O(CH$_2$H$_5$)$_2$/Moles of TiCl$_4$=5.

In a soft drink type bottle previously heated with a free-flame and then cooled under nitrogen, the anhydrous toluene and the desired amount of AlHCl$_2$·O(C$_2$H$_5$)$_2$ are introduced.

The bottle is then closed with a neoprene seal and a crown-type cap punched in such a way as to expose part of the neoprene seal.

The desired amount of butadiene (by means of a hypodermic needle sealed to the butadiene bomb) and then the desired amount of 2-phenylbutadiene (by means of a hypodermic syringe) are introduced.

Always with the aid of a syringe (or occasionally by briefly opening the bottle cooled under inert gas) the benzene solution of the mixture of TiCl$_4$+AlI$_3$ is added.

The bottle is then placed in a rotating thermostatic bath and maintained therein for the desired time.

At the end, the bottle is opened and the contents poured into about one litre of methyl alcohol containing 1% of an antioxidant. The precipitated polymer is dried in an oven under vacuum at room or slightly higher temperature and then weighed.

The results of the tests are reported in the following Table I.

As it appears both are very similar to the composition of the raw product and this is a further demonstration (beside the Tg value) that the elastomer is really a copolymer.

I.R. analysis of the copolymer shows the following composition and structure:

|  | Percent |
|---|---|
| Phenylbutadiene | 10.2 |
| Structure of the butadienic units: | |
| 1,4-cis | 80.7 |
| 1,4-trans | 5.7 |
| 1,2 | 3.4 |

The intrinsic viscosity in toluene at 30° C. is of 3.75 dl./g.

The glass transition temperature (measured with the dilatometer) is of −90° C.

Vulcanization—a tread-type compound for tires is prepared according to the following recipe (parts by weight):

Polymer _____ 100
ZnO _____ 3
Stearic acid _____ 2
HAF Black _____ 50
Sundex 85 _____ 5
Sulphur _____ 2
Vulkacit C.Z. _____ 1

The compound has been vulcanized in a press at 152.6° C. over 30 minutes.

The results of the preformed tests are as follows:

Modulus 300%
 (according to ASTM D412–51T) __kg./cm.$^2$__ 140.3
Ultimate load
 (according to ASTM D412–51T) __kg./cm.$^2$__ 151
Elongation at break
 (according to ASTM D412–51T) ___percent__ 310
Shore hardness A
 (according to ASTM D676–55T) _____ 67
Rebound elasticity
 (according to DIN 53512) _____percent__ 57
Hysteresis
 (according to ASTM D623–58) _____ΔT., ° C__ 19.5
Abrasion
 (according to DIN 53516 (1 kg.)) ___mm.$^3$__ 45

TABLE I

| Ex. No. | Reacted monomers | | Polymerization temperature, ° C. | Copolymer yield, percent | Composition of the copolymer by means of the I.R. analysis, percent | | | | [η] at 30° C. toluene, dl./g. | Tg,[1] ° C. |
|---|---|---|---|---|---|---|---|---|---|---|
|  | Butadiene | 2-phenyl-butadiene |  |  | Phenyl-butadiene | Butadiene | | | | |
|  |  |  |  |  |  | 1,4-cis | 1,4-trans | 1,2 | | |
| 1 | 13.65 | 1.32 | +15 | 90 | 12.5 | 79.6 | 3.4 | 4.5 | 1.2 | |
| 2 | 18 | 3.6 | +5 | 56 | 13.1 | 80.9 | 1.6 | 4.4 | 1.97 | −94 |
| 3 | 10 | 2.66 | +15 | 87 | 26.2 | 67.0 | 2.9 | 3.9 | 1.02 | −81 |
| 4[2] | 14 | 5.2 | +50 | 87 | 31.7 | 58.9 | 5.2 | 4.2 | 1.76 | −85 |
| 5 | 10.67 | 4.14 | +15 | 86 | 30.1 | 63.1 | 3.1 | 3.7 | 0.93 | |
| 6 | 11 | 6.9 | +15 | 79 | 40.8 | 53.4 | 2.2 | 3.6 | 1.02 | −70 |
| 7 | 5.9 | 9.2 | +15 | 70 | 64.9 | 30.5 | 3.0 | 1.6 | 0.83 | |
| 8 | 3.54 | 14.45 | +15 | 40 | 85 | 13.1 | 0.4 | 1.5 | | |

[1] Glass transition temperature of the copolymer.
[2] The raw copolymer has been extracted with methyl-ethyl-ketone (which would dissolve, if they are present, also the homopolymers of the phenylbutadiene and only the low-molecular weight polymers of butadiene) to obtain 30% of extracted fraction. The I.R. analysis on the extracted fraction and on the extraction residue furnishes the following values.—Extract: Poly (phenylbutadiene), 29.4%; polybutadiene 1,4-cis, 59.4%; polybutadiene 1,4-trans, 6.2%; polybutadiene 1,2, 5%. Residue: Poly(phenylbutadiene), 30.5%; polybutadiene 1,4-cis, 59.6%; polybutadiene 1,4-trans, 5.4%; polybutadiene 1,2, 4.5%.

With the same modalities described in Example 1 we have synthesized a butadiene-2-phenylbutadiene copolymer containing 10% of phenylbutadiene units with the purpose of evaluating its technological properties.

The polymerization recipe is as follows:

Toluene _____ 450 cc.
TiCl$_4$ _____ 0.6825·10$^{-3}$ moles.
AlI$_3$ _____ 0.6825·10$^{-3}$ moles.
AlHCl$_2$·O(C$_2$H$_5$)$_2$ ___ 3.41·10$^{-3}$ moles.
Butadiene _____ 77 g.
2-phenylbutadiene _____ 8.5 g.
Temperature of polymerization __ +12° C.
Duration of polymerization ____ 15 hrs.
Yield of solid copolymer _____ 90%.

Example 10

Similarly to what is described in the preceding example we have synthesized a butadiene-2-phenylbutadiene copolymer which contains about 17% of phenylbutadiene units.

The polymerization recipe is the following:

Toluene _____ 450 cc.
TiCl$_4$ _____ 0.6825·10$^{-3}$ moles.
AlI$_3$ _____ 0.6825·10$^{-3}$ moles.
AlHCl$_2$·O(C$_2$H$_5$)$_2$ ___ 3.412·10$^{-3}$ moles.
Butadiene _____ 80 g.
2-phenylbutadiene _____ 16.5 g.
Polmerization temperature ____ +15° C.
Polymerization duration _____ 18 hrs.
Yield of solid copolymer _____ 91%.

I.R. analysis of the polymer reveals a structure as follows:

| | Percent |
|---|---|
| Phenyl-butadienic units | 17.8 |
| Butadienic units | [1] 82.2 |

[1] Subdivided as follows: 74.3% 1,4-cis, 4.2% 1,4-trans, 3.7% 1,2.

The intrinsic viscosity in toluene at 30° C. is 2.08 dl./g.
The glass transition temperature is —85° C.

With the above described polymer there has been prepared, in a laboratory roll-mixer at about 60° C., a tread-type compound for tires according to the recipe reported in Example 9.

The elastomer shows a good workability.
The evaluation on the crude compound:
Workability with the cylinder of the compound: good.
Garvey index at 90° C., 60 r./m. (16 is perfect): 15.5 (according to Garvey: Ind. Eng. Chem. 34, 1309 (1942) with Royle N. ½).

Evaluation on vulcanized compound (152.6° C., for 30 minutes):

| | | |
|---|---|---|
| Modulus at 300% | kg./cm.$^2$ | 100 |
| Ultimate load | kg./cm.$^2$ | 222 |
| Elongation at break | percent | 520 |
| Shore hardness A | | 62 |
| Rebound elasticity | percent | 47 |
| Hysteresis | ΔT., ° C | 25 |
| Abrasion | mm.$^3$ | 55 |

Example 11

A butadiene-2-phenylbutadiene copolymer containing 25% of phenylbutadienic units has been prepared with the following polymerization recipe:

| | |
|---|---|
| Toluene | 450 cc. |
| TiCl$_4$ | 0.6825·10$^{-3}$ moles.[1] |
| AlI$_3$ | 0.6825·10$^{-3}$ moles. |
| AlHCl$_2$·O(C$_2$H$_5$)$_2$ | 4.15·10$^{-3}$ moles.[2] |
| Butadiene | 75 g. |
| 2-phenylbutadiene | 25 g. |
| Polymerization temperature | +15° C. |
| Polymerization duration | 15 hrs. |
| Yield of solid copolymer | 80%. |

[1] I/Ti=3.
[2] AlHCl$_2$·O(C$_2$H$_5$)$_2$/TiCl$_4$=6.

I.R. analysis of the polymer shows the following composition:

| | Percent |
|---|---|
| Phenylbutadienic units | 25.5 |
| Butadienic units | [1] 74.5 |

[1] Subdivided as follows: 68.6% 1,4-cis, 2.1% 1,4-trans, 3.8% 1,2.

The intrinsic viscosity is 2.27 dl./g.
The glass transition temperature is —84° C.

With said copolymer there has been prepared, in a laboratory roll-mixer at about 60° C., a tread-type blend for tires, according to the recipe given in Example 9.

Evaluation on crude blend:
Workability of the blend with the rolls: Good.
Garvey index at 90° C. 60 r./min. 15.5 (16 is perfect).

Evaluation on vulcanized blend (at 152.6° C. for 30 minutes):

| | | |
|---|---|---|
| Modulus 300% | kg./cm.$^2$ | 106.5 |
| Ultimate load | kg./cm.$^2$ | 217 |
| Elongation at break | percent | 490 |
| Shore hardness A | | 63 |
| Rebound elasticity | percent | 49 |
| Hysteresis | ΔT., ° C | 21.5 |
| Abrasion | mm.$^3$ | 60 |

Example 12

The technological characteristics of a butadiene-2-phenylbutadiene copolymer containing 40% of phenylbutadienic units, prepared according to the hereinafter indicated polymerization recipe, have been evaluated:

| | |
|---|---|
| Toluene | 450 cc. |
| TiCl$_4$ | 0.5687·10$^{-3}$ moles. |
| AlI$_3$ | 0.5687·10$^{-3}$ moles. |
| AlHCl$_2$·O(C$_2$H$_5$)$_2$ | 2.8435·10$^{-3}$ moles. |
| Butadiene | 48 g. |
| 2-phenylbutadiene | 32 g. |
| Polymerization temperature | +15° C. |
| Polymerization duration | 15 hrs. |
| Yield of solid copolymer | 85%. |

I.R. analysis of the copolymer shows the following composition:

| | Percent |
|---|---|
| Phenylbutadienic units | 40 |
| Butadienic units | [1] 60 |

[1] Subdivided as follows: 53.9% 1,4-cis, 2.8% 1,4-trans, 3.3% 1,2.

The intrinsic viscosity is 2.01 dl./g.
The glass transition temperature is —70° C.

A thread-type blend for tires has been prepared with the copolymer in a laboratory roll-mixer at about 60° C., according to the recipe of Example 9.

Evaluation on crude blend:
Workability of the blend with the rolls: Very good.
Garvey index at 90° C. 60 r./min. (16 is perfect) 16.

Evaluation on vulcanized blend (152.6° C. for 30 minutes):

| | | |
|---|---|---|
| Modulus 300% | kg./cm.$^2$ | 121 |
| Ultimate load | kg./cm.$^2$ | 236 |
| Elongation at break | percent | 510 |
| Shore hardness A | | 64 |
| Rebound elasticity | percent | 40 |
| Hysteresis | ΔT., ° C | 25 |
| Abrasion | mm.$^3$ | 90 |

TABLE II

| Technological Properties [1] | Polybutadiene with a 95% 1,4-cis enchainment | Copolymer, butadienestyrene PHILPRENE X 40 | Butadiene-2-phenylbutadiene Copolymers | | | |
|---|---|---|---|---|---|---|
| | | | Ex. 9 | Ex. 10 | Ex. 11 | Ex. 12 |
| Workability with the rolls (60–70° C.) | [2] | [3] | [4] | [5] | [5] | [3] |
| Garvey Index at 90° C., 60 r./min. (16 is perfect) | 7 | 16 | 3.5 | 15.5 | 15.5 | 16 |
| Vulcanization at 152.6° C. for 30 minutes: | | | | | | |
| Modulus 300%, kg./cm.$^2$ | 114.5 | 160 | 140.3 | 100 | 106.5 | 121 |
| Ultimate load, kg./cm.$^2$ | 194 | 189 | 151 | 222 | 217 | 236 |
| Elongation at break, percent | 410 | 350 | 310 | 520 | 490 | 510 |
| Shore hardness A | 63 | 81 | 67 | 62 | 63 | 64 |
| Rebound elasticity, percent | 54 | 34 | 57 | 47 | 49 | 40 |
| Hysteresis, ΔT.° C | 20 | 41 | 19.5 | 25 | 21.5 | 25 |
| Abrasion, mm.$^3$ | 35 | 100 | 45 | 55 | 60 | 90 |

[1] The blend recipe utilized for all the samples is the following (parts by weight): Polymer 100, ZnO 3, Stearic acid 2, black HAF 50, Sundex-85 5, Sulphur 2, Vulkacit CZ 1.
[2] Insufficient.
[3] Very good.
[4] Sufficient.
[5] Good.

For the sake of convenience the technological properties described in each example are summarized in Table II and compared with those of the same blends prepared with polybutadiene prevailingly 1,4-cis and with a butadiene-styrene copolymer obtained in solution and containing 25% by weight of styrene.

The measurements were made as specified in examples 9 and 10.

Example 13

The catalyst system for copolymerizing butadiene with 2-phenylbutadiene is formed by $AlH_3 \cdot N(CH_3)_3$, $AlI_3$ and $TiCl_4$.

The polymerization recipe is the following:

| | |
|---|---|
| Toluene | 100 cc. |
| $TiCl_4$ | $0.2275 \cdot 10^{-3}$ moles. |
| $AlI_3$ | $0.2275 \cdot 10^{-3}$ moles. |
| $AlH_3 \cdot N(CH_3)_3$ | $0.295 \cdot 10^{-3}$ moles; $AlH_3NR_3/Ti = 1.3$. |
| Butadiene | 11.79 g. |
| 2-phenylbutadiene | 3.09 g. |
| Polymerization temperature | +15° C. |
| Polymerization duration | 18 hrs. |
| Yield of solid copolymer | 76%. |

The intrinsic viscosity is 1.92 dl./g.

I.R. analysis of the copolymer shows the following structure and composition:

| | Percent |
|---|---|
| Phenylbutadienic units | 20 |
| Butadienic units | [1] 80 |

[1] Subdivided as follows: 72% 1,4-cis, 4% 1,4-trans, 4% 1,2.

Example 14

This example and the following show the possibility of employing aluminum-alkyls as co-catalysts in the preparation of butadiene-2-phenylbutadiene copolymer.

The recipe is the following:

| | |
|---|---|
| Toluene | 100 cc. |
| $TiI_2Cl_2$ | $0.501 \cdot 10^{-3}$ moles. |
| $Al(C_2H_5)_3$ | $1.5 \cdot 10^{-3}$ moles $Al/Ti = 3$. |
| Butadiene | 14.45 g. |
| Phenylbutadiene | 3.14 g. |
| Polymerization temperature | +15° C. |
| Polymerization duration | 15 hrs. |
| Yield of solid copolymer | 70%. |

I.R. analysis of the copolymer shows the following composition and structure:

| | Percent |
|---|---|
| Phenylbutadienic units | 19 |
| Butadienic units | [1] 81 |

[1] Subdivided as follows: 63% 1,4-cis, 12% 1,4-trans, 6% 1,2.

Example 15

The catalyst system is formed by $Al(C_2H_5)_3$, $I_2$ and $TiCl_4$. The amounts and the polymerization conditions are as follows:

| | |
|---|---|
| Benzene | 100 cc. |
| $I_2$ | $0.2275 \cdot 10^{-3}$ moles. |
| $TiCl_4$ | $0.2275 \cdot 10^{-3}$ moles. |
| $Al(C_2H_5)_3$ | $2.72 \cdot 10^{-3}$ moles $AlR_3/Ti = 12$. |
| Butadiene | 15.11 g. |
| 2-phenylbutadiene | 3.7 g. |
| Polymerization temperature | +15° C. |
| Polymerization duration | 15 hrs. |
| Yield of copolymer | 84%. |
| Intrinsic viscosity | 0.74 dl./g. |

I.R. analysis of the copolymer shows the following structure:

| | Percent |
|---|---|
| Phenylbutadienic units | 23 |
| Butadienic units | [1] 77 |

[1] Subdivided as follows: 59% 1,4-cis, 14% 1,4-trans, 4% 1,2.

Variations can of course be made without departing from the spirit of the invention.

Having thus described our invention, what we desire to secure and claim by Letters Patent is:

1. Substantially linear, stereoregular rubbery vulcanizable high molecular weight copolymer of butadiene and 2-phenylbutadiene in a weight ratio in the range of 9:1 to 3:2, the 2-phenylbutadiene units of the copolymer having substantially 1,4 enchainment and the butadiene units of the copolymer having at least 90% 1,4-cis enchainment.

2. Copolymers as in claim 1 consisting essentially of 15 to 25% of the 2-phenylbutadiene units and 85 to 75% of the butadiene units.

3. Copolymers as in claim 1 in which the content of 1,2-butadiene units is at most 5%.

4. Elastomer obtained by sulfur-vulcanization of the copolymer of claim 1.

5. Elastomer obtained by the sulfur-vulcanization of the copolymer of claim 2.

6. Process for the production of substantially linear, stereoregular rubbery vulcanizable, high molecular weight copolymers which comprises copolymerizing butadiene and 2-phenylbutadiene in a weight ratio of about 9:1 to 3:2 in contact with a complex catalytic system comprising (a) a titanium halide and (b) a reducing compound of aluminum, said catalytic system comprising iodine, the components of the catalyst being present in sufficient proportions to effect the copolymerization, the molar ratio of said reducing compound to said titanium halide being greater than one, and there being at least 0.25 atom of iodine per molecule of said titanium halide, thereby to obtain a rubbery copolymer in which the 2-phenylbutadiene units have substantially 1,4-enchainment and at least 90% of the butadiene units have 1,4-cis enchainment.

7. Process as in claim 6 in which the iodine is present as said titanium halide, said reducing compound, elementary iodine or an inorganic iodide other than said titanium halide and reducing compound, and said molar ratio is up to 8:1.

8. Process as in claim 6 in which said reducing compound is selected from the group consisting of an Al-trialkyl, an Al-alkylhalide, an Al-alkylhydride, an Al-halohydride, an Al-aminohydride and an Al-aminohalohydride.

9. Process as in claim 7 in which said other inorganic iodide when present is bismuth iodide, aluminum iodide or magnesium iodide.

10. Process as in claim 7 in which the molar ratio of said reducing compound to said titanium halide is 2:1 to 8:1.

11. Process as in claim 9 in which the molar ratio of said reducing compound to said titanium halide is 2:1 to 8:1, there is present 0.5 to 15 atoms of iodine per molecule of titanium halide, the reaction temperature is −20° to +70° C. and the polymerization is carried out in the presence of an inert solvent.

12. Process as in claim 11 in which the reaction temperature is −5° to +25° C.

13. Process as in claim 10 in which there are 0.25 to 50 atoms of iodine per molecule of said titanium halide.

14. Process as in claim 8 in which said reducing compound is simple or complexed with a Lewis base.

References Cited

UNITED STATES PATENTS

| | | | |
|---|---|---|---|
| 2,977,349 | 3/1961 | Brockway et al. | 260—94.3 |
| 3,165,503 | 1/1965 | Kahn et al. | 260—82.1 |
| 3,205,213 | 8/1965 | Stearns et al. | 260—94.3 |

(Other references on following page)

| FOREIGN PATENTS | | |
|---|---|---|
| 1,259,291 | 3/1961 | France. |
| 843,207 | 8/1960 | Great Britain. |

OTHER REFERENCES

Chemical Abstract, vol. 58, pages 4444–4445, 1963.

JOSEPH L. SCHOFER, *Primary Examiner.*

J. C. HAIGHT, *Assistant Examiner.*

U.S. Cl. X.R.

260—82.1, 84.1